US008878378B2

(12) United States Patent
Kabatzke et al.

(10) Patent No.: US 8,878,378 B2
(45) Date of Patent: Nov. 4, 2014

(54) METHOD FOR OPERATING A PITCH-CONTROLLED WIND TURBINE

(75) Inventors: Wolfgang Kabatzke, Geesthacht (DE); Hermann Rochholz, Bozen (IT)

(73) Assignee: Nordex Energy GmbH, Hamburg (DE)

(*) Notice: Subject to any disclaimer, the term of this patent is extended or adjusted under 35 U.S.C. 154(b) by 305 days.

(21) Appl. No.: 13/315,809

(22) Filed: Dec. 9, 2011

(65) Prior Publication Data

US 2012/0146332 A1    Jun. 14, 2012

(30) Foreign Application Priority Data

Dec. 10, 2010   (DE) .......................... 10 2010 054 013

(51) Int. Cl.
*H02P 9/04* (2006.01)
*F03D 7/02* (2006.01)

(52) U.S. Cl.
CPC .............. *F03D 7/0224* (2013.01); *F03D 7/028* (2013.01); *F05B 2270/324* (2013.01); *F05B 2210/20* (2013.01); *F05B 2270/325* (2013.01); *Y02E 10/723* (2013.01); *F05B 2270/323* (2013.01)
USPC .......................................................... 290/44

(58) Field of Classification Search
CPC .......... F03D 7/00; F03D 7/022; F03D 7/0228
USPC .......................................... 290/44, 55; 416/1
See application file for complete search history.

(56) References Cited

U.S. PATENT DOCUMENTS

| | | | |
|---|---|---|---|
| 5,289,041 A * | 2/1994 | Holley | 290/44 |
| 7,023,105 B2 | 4/2006 | Wobben | |
| 7,317,260 B2 * | 1/2008 | Wilson | 290/44 |
| 7,351,033 B2 | 4/2008 | McNerney | |
| 7,420,289 B2 | 9/2008 | Wang et al. | |
| 7,425,774 B2 * | 9/2008 | Shibata et al. | 290/55 |
| 7,471,327 B2 | 12/2008 | Hosier et al. | |
| 7,629,702 B2 * | 12/2009 | Schubert | 290/44 |
| 8,096,761 B2 | 1/2012 | Fric et al. | |
| 8,174,136 B2 * | 5/2012 | Johnson et al. | 290/44 |
| 8,386,085 B2 | 2/2013 | Schwarze et al. | |
| 2008/0112807 A1 | 5/2008 | Uphues et al. | |
| 2009/0295160 A1 * | 12/2009 | Wittekind et al. | 290/44 |
| 2010/0098540 A1 | 4/2010 | Fric et al. | |
| 2010/0140938 A1 | 6/2010 | Cook | |
| 2011/0089693 A1 * | 4/2011 | Nasiri | 290/44 |
| 2012/0078518 A1 * | 3/2012 | Krishna | 702/3 |

OTHER PUBLICATIONS

Hau, E., Wind Turbines Fundamentals, Technologies, Application, Economics, 2nd Edition, 2006, Springer-Verlag Berlin Heidelberg, Germany, pp. 372 to 374.

* cited by examiner

*Primary Examiner* — Michael Zarroli
(74) *Attorney, Agent, or Firm* — Walter Ottesen P.A.

(57) ABSTRACT

The invention is directed to a method for operating a pitch-controlled wind turbine having a rotor blade adjustable about its longitudinal axis and having a generator wherein a set-point for a generator torque (M) is specified in dependence upon a rotational speed (n) of the generator or of the rotor. A transition point ($n_3$, $M_3$) is provided whereat a switchover occurs from a part-load operation to a full-load operation. In the method, a value for air density ($\rho$) is determined and a pre-pitch angle ($\phi_{pre}$) is set starting at a pre-pitch rotational speed ($n_4$) less than the rotational speed ($n_3$) at the transition point ($n_3$, $M_3$). The value of the pre-pitch angle ($\phi_{pre}$) is dependent on the value determined for the air density ($\rho$) so that a larger pre-pitch angle is set when the air density is lower than when the air density is higher.

10 Claims, 2 Drawing Sheets

METHOD FOR OPERATING A PITCH-CONTROLLED WIND TURBINE

CROSS REFERENCE TO RELATED APPLICATION

This application claims priority of German patent application no. 10 2010 054 013.7, filed Dec. 10, 2010, the entire content of which is incorporated herein by reference.

FIELD OF THE INVENTION

The present invention relates to a method for operating a pitch-controlled wind turbine in which a set-point for a generator torque is provided dependent on a rotational speed of the generator or rotor. The allocation rule for the set-point of the generator torque dependent on the rotational speed has a transition point at which a transition from a part-load operation to a nominal-load operation occurs. In the nominal-load operation, a control of the rotational speed is primarily done by adjusting the blade pitch angle for at least one rotor blade.

BACKGROUND OF THE INVENTION

Normally, in the development of wind turbines, a defined nominal air density of, for example, $\rho=1.225$ kg/m$^3$ is assumed.

From U.S. Pat. No. 7,023,105 B2, a method for controlling a wind turbine having an electric generator using air density data at the location of the wind turbine is known. In the method, the generator is controlled by a control unit which processes the air-density data, controls the generator and adjusts the performance data of the generator in dependence on the air density. In the known method, the elevation of the site of the wind turbine above sea level is taken into account, whereby the lower air density is taken into account in the power curve. In this way, the power, which is to be generated by the wind turbine and which is assigned to a rotor speed and therewith to a specific tip speed ratio, can be correspondingly adapted; that is, this power can be reduced so that the generator torque does not exceed the torque made available via the generator as a consequence of an excitation power fed by the control unit. Overall, the efficiency determined via the power curve is to be maintained and the maximum amount of energy should be taken from the wind.

From U.S. Pat. No. 7,420,289 B2, a method for calculating a power curve for high altitude sites is known. Therein, starting from a relation between the power coefficient $C_P$ and the tip speed ratio $\lambda$, a relation between the electric output power P and the wind speed is determined.

From United States patent application publication 2008/0112807 A1, a wind turbine is known in which the output power is reduced when the temperature of the ambient air drops below a predetermined threshold value. The reason for the power reduction is that with temperatures below $-20°$ C., the operation of the wind turbine can require other load calculations.

For the effects of the air density on the yield of the wind turbine, it is to be considered that in pitch-controlled wind turbines, a change in the air conditions can lead to aerodynamic stall-effects with an undesired stall.

SUMMARY OF THE INVENTION

It is an object of the invention to provide an improved method for operating a pitch-controlled wind turbine which switches into full-load operation in a stable manner and, at the same time, undesired stall effects at the rotor blade are avoided.

The method of the invention is for operating a pitch-controlled wind turbine having at least one rotor blade adjustable about its longitudinal axis to define a pitch angle ($\phi$), and having a generator wherein a set-point for a generator torque (M) is specified in dependence upon a rotational speed (n) of the generator or of the rotor, and wherein a transition point ($n_3$, $M_3$) is provided whereat there is a switchover from a part-load operation to a full-load operation. The method includes the steps of: determining a value for an air density ($\rho$); and, setting the pitch angle ($\phi$) to a pre-pitch angle ($\phi_{pre}$) having a value starting at a pre-pitch rotational speed ($n_4$) which is less than the rotational speed ($n_3$) at the transition point ($n_3$, $M_3$) with the value of the pre-pitch angle ($\phi_{pre}$) being dependent on the value determined for the air density ($\rho$) so as to cause a larger pre-pitch angle to be set when the air density is lower than when the air density is higher.

In the method according to the invention, there is an operation of a pitch-controlled wind turbine in which a set-point M for the generator torque is pre-defined in dependence on a rotational speed n of the generator or of the rotor. A transition point ($n_3$, $M_3$), in which a changeover between part-load operation and full-load operation occurs, is provided for defining the set-point of the generator torque. Generally, in the operation of the wind turbine, a distinction is to be made between a part-load operation and a full-load operation, sometimes also referred to as nominal-load operation. In part-load operation, the set-point for the generator torque is increased with increasing rotational speed. At full-load operation, a control of the rotational speed of the generator is effected by adjusting the blade pitch angle for at least one rotor blade. The transition from the part-load operation to the full-load operation takes place at a transition point, which is defined by a value for the rotational speed $n_3$ and a set-point for the generator torque $M_3$. According to the invention, a value for the air density is determined.

Further, the method according to the invention provides that a pre-pitch angle for at least one rotor blade is set starting at a pre-pitch rotational speed. The pre-pitch rotational speed is less than the rotational speed $n_3$ at the transition point. The pre-pitch angle, here, refers to a blade pitch angle which is already present in the part-load operation of the wind turbine and can continue up into the nominal-load operation of the wind turbine until a regular control sets in in the nominal-load operation. By setting the pre-pitch angle, the wind turbine already has a blade pitch angle other than zero at the transition point.

According to the invention, the value of the pre-pitch angle is dependent upon the determined value for the air density. The dependency is defined such that with lower air density, a larger pre-pitch angle is set than with higher air density. In contrast to a solution wherein the pre-pitch angle for the transition point is a constant, in the method according to the invention, an air-density-dependent pre-pitch angle prevents that too large a pre-pitch angle is selected in the case of high air density. The invention is based on the recognition that, in the case of high air density, a large pre-pitch angle is for the most part unnecessary and detrimental to the yield of the wind turbine.

In a preferred embodiment of the method according to the invention, the pitch angle is constant as of a minimal rotational speed up to reaching the pre-pitch rotational speed, preferably pre-defined with a value of zero degree. The pre-pitch rotational speed is a first rotational speed whereat the pre-pitching begins. In this embodiment of the method according to the invention, a constant blade pitch angle is pregiven for the rotational speed range between the minimal rotational speed and the pre-pitch rotational speed.

In a preferred embodiment, the pitch angle is increased starting from the pre-pitch rotational speed up to reaching a maximum pre-pitch rotational speed with the maximum pre-pitch rotational speed being greater than or equal to the rotational speed at the transition point. The increase can take place linearly, section-wise linearly or in another form. In this embodiment of the method, it is ensured that the pitch angle is increased starting with reaching the pre-pitch rotational speed up to when the transition point is reached. Preferably, the increasing of the pitch angle takes place completely linearly or section-wise linearly.

In a preferred embodiment, the value of the pre-pitch angle at a rotational speed, for example, the rotational speed at the transition point, is provided by the following formula:

$$\varphi_{pre} = \max\left(\varphi_{lim}, \varphi_b + \Delta\varphi\left(1 - \frac{\rho}{\rho_{norm}}\right)\right),$$

wherein $\phi_{lim}$, $\phi_b$ and $\Delta\phi$ are constants for the pitch angle and $\rho_{norm}$ refers to an air density prevailing at normal conditions. $\phi_{lim}$ is a rotor-blade-specific constant which is dependent on the tip speed ratio. The relationship described above between pre-pitch angle $\phi_{pre}$ and air density $\rho$ ensures that with low air density, a larger pre-pitch angle is selected than at high air density. The determined air density $\rho$ is included in the expression for the pre-pitch angle. If the wind turbine is operating at an air density which corresponds to the air density $\rho_{norm}$ prevailing under normal conditions, then the pre-pitch angle $\phi_b$ results. If the air density is clearly lower than the air density prevalent under normal conditions, then the pre-pitch angle $\phi_{pre}$ is increased by a fraction of $\Delta\phi$. The function "max(( . . . / . . . ))" selects the larger one of the two argument values and thus avoids a negative pre-pitch angle. The value of $\phi_b$ lies in an order of magnitude of "1°"; $\Delta\phi$ lies in an order of magnitude of "10°".

In the method according to the invention, the air density is determined in dependence upon a measured air temperature T and a measured air pressure p as well as a value for the humidity $\psi$. The values for the air temperature and the air pressure are preferably measured directly at the wind turbine. The value for the humidity $\psi$ can be pre-defined in dependence upon the time of day and/or time of year. In this pre-definition, a corresponding empirical value for the humidity $\psi$ is pre-defined. Alternatively, it is also possible to directly measure the humidity $\psi$.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
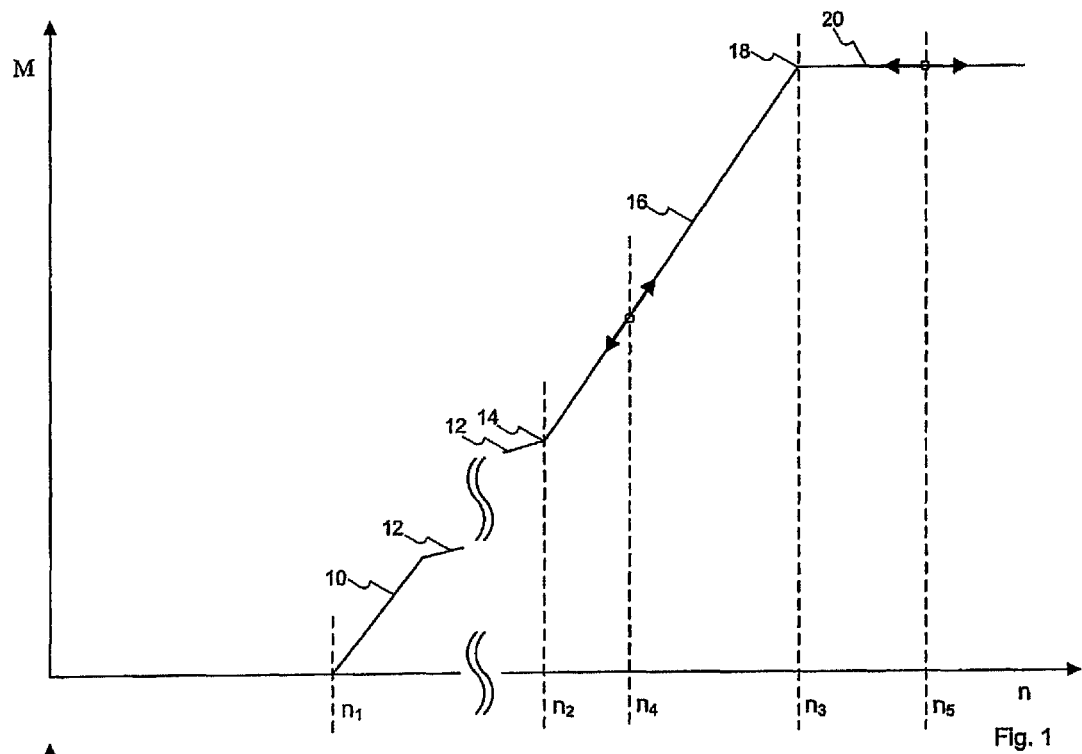
FIG. 1 shows a course of the set-point for the generator torque as a function of the rotational speed.

FIG. 1 shows the set-point for the generator torque M as a function of the generator rotational speed n. A total of four sections can be distinguished for the course of the set-point for the generator torque. In a first section 10, a linear increase of the set-point for the generator torque occurs with increasing rotational speed.

In a second section 12, the set-point for the generator torque follows the ideal characteristic curve of the rotor. The set-point of the generator torque is calculated via a function for the optimal power $P_{opt}$, which is as follows:

$$P_{opt}(n) = \left(2*\pi*R*\frac{n}{i_G}*\frac{1}{60*\lambda_{Opt}}\right)^3 * \pi * R^2 * \frac{\rho}{2} * C_{p,opt},$$

wherein: R is the radius of the rotor blade; n is the generator rotational speed; $i_G$ is the gear ratio of the gear assembly; $\lambda_{opt}$ is the optimal tip speed ratio of the rotor blade; $\rho$ is the air density; and, $C_{p,\,opt}$ is the optimal power coefficient. Along the section 12, the set-point for the generator torque is analytically calculated according to the above formula, wherein the power is converted into the set-point M for the generator torque via the angular frequency of the generator $\omega=2\,\pi n$ according to M=P/$\omega$.

At point 14, there is an inflection point between the second section 12 and a third section 16. In the third section 16 and for achieving an optimal energy yield, there is a departure from the ideal characteristic curve 12 and the set-point for the generator torque is increased more intensely with increasing rotational speed of the generator. In the embodiment shown, the third section 16 is shown as a linearly increasing section. Other, non-linear shapes of the increase between the inflection point 14 and a transition point 18 are also possible.

At the transition point 18, the wind turbine passes into its full-load operation 20. In this region, the power of the wind turbine is to be held constant. The power P is proportional to the rotational speed and to the torque of the generator:

$$P=M*\omega,$$

wherein: $\omega=2\,\pi n$ is the angular frequency of the generator.

Figure 2:
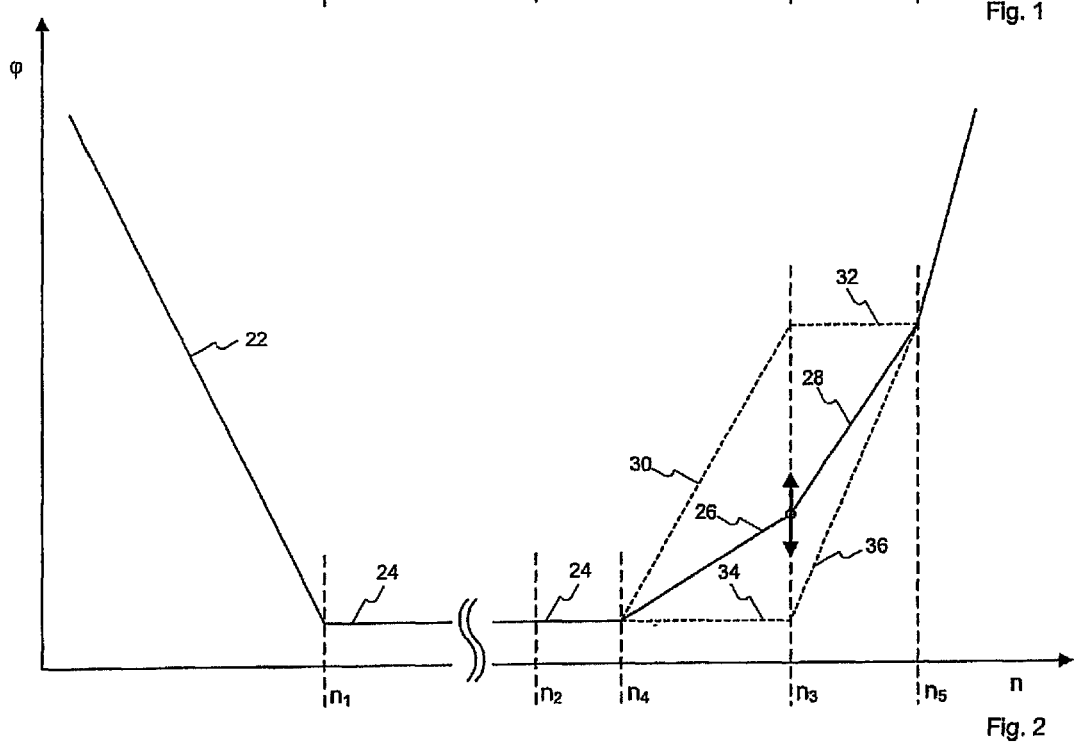
FIG. 2 shows the change in the pitch angle in dependence upon the rotational speed; and, FIG. 3 is a schematic of a pitch-controlled wind turbine.

In the method according to the invention, in the third section 16, a pitch angle dependent on the air density begins to be pre-defined. FIG. 2 shows the course of the pitch angle $\phi$ in dependence on the rotational speed. For rotational speeds less than $n_1$, at which the wind turbine is started, the pitch angle is initially reduced along the curve 22 until the rotational speed $n_1$ is reached.

In the embodiment shown in FIG. 2, the pitch angle initially remains at 0° in the section 24 of the characteristic curve. Starting with a pre-pitch rotational speed $n_4$, the pitch angle is increased until the rotational speed $n_5$ is reached. As shown in FIG. 2, the pitch angle $\phi$, in the rotational speed interval provided for pre-pitching, is increased along sections (26, 28) section-wise and preferably linearly starting at the rotational speed $n_4$ up to rotational speed $n_5$. A full-load operation of the wind turbine is already present at rotational speed $n_5$. If a lower air density than the air density present under normal conditions is determined, then the pre-pitch angle is increased in the rotational speed interval. The pre-pitch angle then runs, for example, section-wise linearly, along the lines 30 and 32. If a higher air density is present, then a lower pitch angle is selected which, for example, runs linearly along the lines 34 and 36.

In order to determine the air density dependent pre-pitch angle, a rotational speed is selected in the rotational speed interval specified for pre-pitching, and the pre-pitch angle for the selected rotational speed is determined according to the above formula for $\phi_{pre}$ dependent on the air density. In the embodiment shown, the rotational speed $n_3$ was selected as the rotational speed from the rotational speed interval. Any other rotational speed from the rotational speed interval could have been selected as well.

The exact course of the pre-pitch angle then results by interpolating between a pre-pitch angle of zero at the rotational speed $n_4$ and the air-density-dependent value at the rotational speed $n_3$. The further course of the pre-pitch angle results by interpolating from the air-density-dependent value for the rotational speed $n_3$ to a pre-determined value for the pitch angle at the maximum pre-pitch rotational speed $n_5$. This pre-determined value of the pre-pitch angle at the maximum pre-pitch rotational speed $n_5$ corresponds to a typical pitch angle in the nominal-load operation for the rotational speed $n_5$. In this manner, the value of the pre-pitch angle in the interval $n_4$ to $n_5$ is dependent on the air density per the present invention and connects to the control of the pitch angle in the nominal-load operation at the rotational speed $n_5$.

Figure 3:
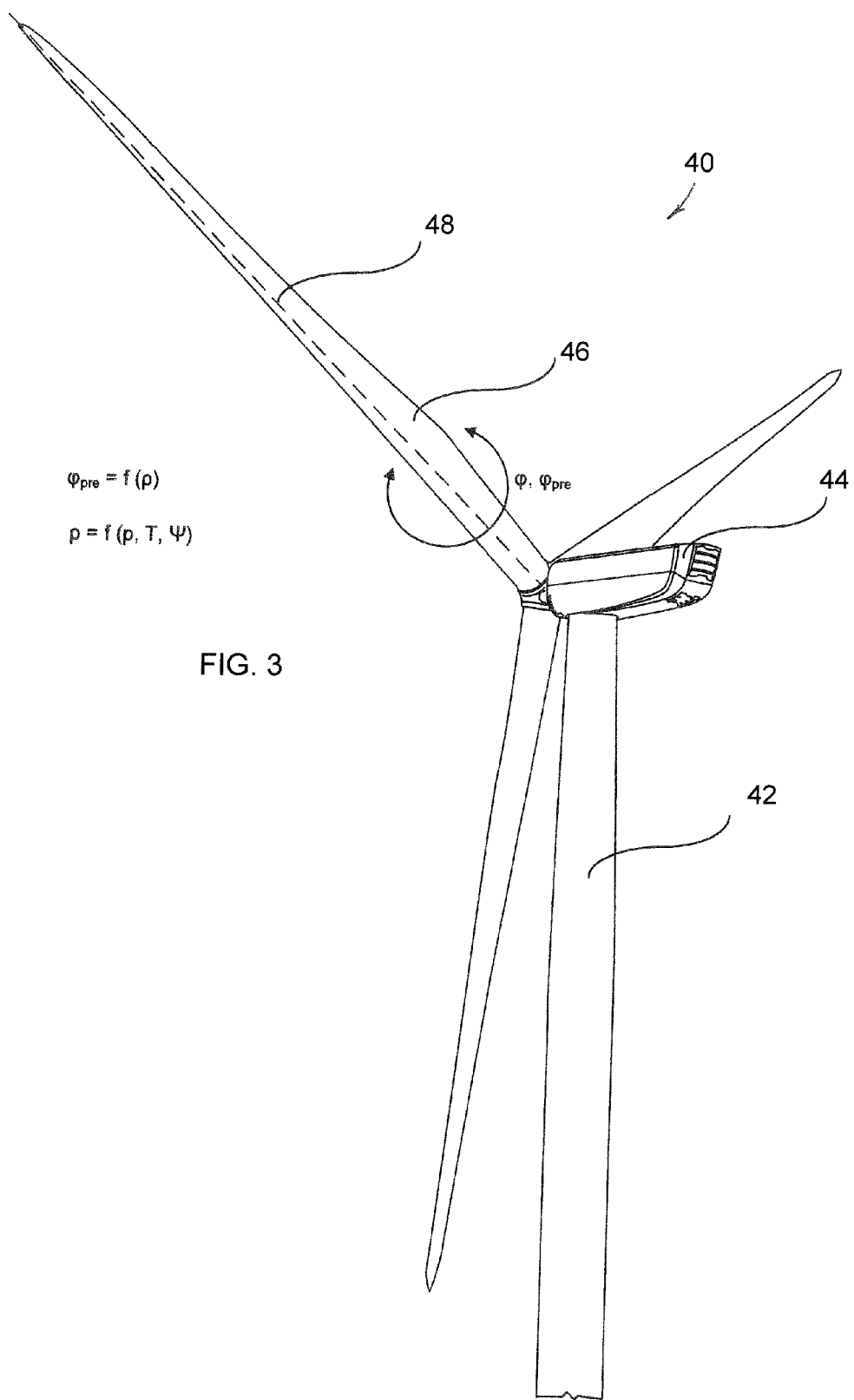

FIG. 3 is a schematic of a pitch-controlled wind turbine 40 having a tower 42 on which is mounted a nacelle 44. The rotor blade 46 defines a longitudinal axis 48. The rotor blade 46 is adjustable about its longitudinal axis 48 to define a pitch angle $\phi$. The air density is shown in FIG. 3 with the equation $\rho=f(p, T, \Psi)$.

It is understood that the foregoing description is that of the preferred embodiments of the invention and that various changes and modifications may be made thereto without departing from the spirit and scope of the invention as defined in the appended claims.

What is claimed is:

1. A method for operating a pitch-controlled wind turbine having at least one rotor blade adjustable about its longitudinal axis to define a pitch angle ($\phi$), and having a generator wherein a set-point for a generator torque (M) is specified in dependence upon a rotational speed (n) of the generator or of the rotor, and wherein a transition point ($n_3$, $M_3$) is provided whereat there is a switchover from a part-load operation to a full-load operation, the method comprising the steps of:

determining a value for an air density ($\rho$); and, setting said pitch angle ($\phi$) to a pre-pitch angle ($\phi_{pre}$) starting at a pre-pitch rotational speed ($n_4$) which is below the rotational speed ($n_3$) at said transition point ($n_3$, $M_3$) with said value of said pre-pitch angle ($\phi_{pre}$) being dependent on said value determined for said air density ($\rho$) so as to cause a larger pre-pitch angle to be set when said air density is lower than when said air density is higher.

2. The method of claim 1, wherein said pitch angle ($\phi$) is constant starting at a minimal rotational speed ($n_1$) up to reaching said pre-pitch rotational speed ($n_4$).

3. The method of claim 2, wherein the constant value of the pitch angle ($\phi$) is zero.

4. The method of claim 1, wherein the pitch angle ($\phi$) is increased starting at the pre-pitch rotational speed ($n_4$) up to reaching a maximum pre-pitch rotational speed ($n_5$) wherein the maximum pre-pitch rotational speed ($n_5$) is greater than or equal to the rotational speed ($n_3$) at said transition point ($n_3$, $M_3$).

5. The method of claim 4, wherein the pitch angle ($\phi$) is increased linearly.

6. The method of claim 1, wherein the air density ($\rho$) is determined dependent on a measured air temperature (T), a measured air pressure (p) and a value for the humidity ($\psi$).

7. The method of claim 6, wherein the value for the humidity ($\psi$) is pregiven in dependence upon a time of day and/or time of year.

8. The method of claim 6, wherein the value for the humidity ($\psi$) is measured.

9. A method for operating a pitch-controlled wind turbine having at least one rotor blade adjustable about its longitudinal axis to define a pitch angle ($\phi$), and having a generator wherein a set-point for a generator torque (M) is specified in dependence upon a rotational speed (n) of the generator or of the rotor, and wherein a transition point ($n_3$, $M_3$) is provided whereat there is a switchover from a part-load operation to a full-load operation, the method comprising the steps of:

determining a value for an air density ($\rho$);

setting said pitch angle ($\phi$) to a pre-pitch angle ($\phi_{pre}$) starting at a pre-pitch rotational speed ($n_4$) which is below the rotational speed ($n_3$) at said transition point ($n_3$, $M_3$) with said value of said pre-pitch angle ($\phi_{pre}$) being dependent on said value determined for said air density ($\rho$) so as to cause a larger pre-pitch angle to be set when said air density is lower than when said air density is higher; and, wherein $\phi_{lim}$, $\phi_b$ and $\Delta\phi$ are constants for the pitch angles and the value of said pre-pitch angle ($\phi_{pre}$) at a predetermined rotational speed results as:

$$\varphi_{pre} = \max\left(\varphi_{lim},\ \varphi_b + \Delta\varphi\left(1 - \frac{\rho}{\rho_{norm}}\right)\right),$$

wherein: said $\phi_{lim}$, $\phi_b$ and $\Delta\phi$ are constants for the pitch angle; $\rho_{norm}$ refers to an air density prevailing under normal conditions and $\rho$ refers to the determined air density.

10. The method of claim 9, wherein the pre-pitch angle ($\phi_{pre}$) is determined for the rotational speed ($n_3$) at said transition point ($n_3$, $M_3$).

* * * * *